United States Patent
Hernández Zamora (10) Patent No.: US 10,183,892 B2
(45) Date of Patent: Jan. 22, 2019

(54) SBS LATEX FOR USE IN THE MODIFICATION OF CONCRETE

(71) Applicant: DYNASOL ELASTÓMEROS, S.A. DE C.V., Altamira, Tamaulipas (MX)

(72) Inventor: Gabriel Hernández Zamora, Altamira (MX)

(73) Assignee: DYNASOL ELASTOMEROS, S.A. DE C.V., Altamira, Tamaulipas (MX)

( * ) Notice: Subject to any disclaimer, the term of this patent is extended or adjusted under 35 U.S.C. 154(b) by 0 days.

(21) Appl. No.: 15/537,175

(22) PCT Filed: Dec. 19, 2014

(86) PCT No.: PCT/MX2014/000214
§ 371 (c)(1),
(2) Date: Jun. 16, 2017

(87) PCT Pub. No.: WO2016/099238
PCT Pub. Date: Jun. 23, 2016

(65) Prior Publication Data
US 2017/0349489 A1 Dec. 7, 2017

(51) Int. Cl.
| C04B 24/26 | (2006.01) |
| C04B 14/06 | (2006.01) |
| C04B 28/04 | (2006.01) |
| C09K 8/467 | (2006.01) |
| C04B 111/00 | (2006.01) |

(52) U.S. Cl.
CPC ......... C04B 24/2676 (2013.01); C04B 14/06 (2013.01); C04B 28/04 (2013.01); C09K 8/467 (2013.01); *C04B 2111/00482* (2013.01); *C04B 2111/00603* (2013.01); *C04B 2111/00637* (2013.01); *C04B 2201/50* (2013.01)

(58) Field of Classification Search
CPC ..... C04B 24/2676; C04B 28/04; C04B 14/06; C04B 2111/00482; C04B 2111/00637; C04B 2201/50; C04B 2111/00603
See application file for complete search history.

(56) References Cited

U.S. PATENT DOCUMENTS

| 4,057,528 A | * | 11/1977 | Hunt | ........................ C04B 28/04 |
| | | | | 524/575 |
| 5,132,183 A | * | 7/1992 | Gaidis | ................. C04B 41/4876 |
| | | | | 156/280 |

FOREIGN PATENT DOCUMENTS

KR  1 454 400 B1 * 10/2014

* cited by examiner

*Primary Examiner* — Robert D. Harlan
(74) *Attorney, Agent, or Firm* — Womble Bond Dickinson (US) LLP; Cristin H. Cowles; Heath T. Misley (57) ABSTRACT

The invention relates to compositions of cement and concrete having properties of resistance, modulus and expansion which are significantly improved, using an additive for cement based on thermoplastic styrene-butadiene-styrene (SBS) copolymer in cationic latex, when compared with non-modified cement and concrete references.

8 Claims, 8 Drawing Sheets

SBS LATEX FOR USE IN THE MODIFICATION OF CONCRETE

RELATED APPLICATION

This application is a U.S. national stage filing under 35 U.S.C. § 371(c), of International Application No. PCT/MX2014/000214, filed on Dec. 19, 2014. The entire content of the aforementioned application is incorporated herein by reference.

TECHNICAL FIELD OF THE INVENTION

The present invention refers to the use of styrene-butadiene-styrene (SBS) latex as an additive in Portland cement or concrete.

BACKGROUND OF THE INVENTION

The pavement systems containing cement-bound layers have been used worldwide for over a century, with great success. Portland cement can be used in virtually every layer in a pavement system. Typical applications include improving the quality of subgrade soils and stabilizing base materials. Integrating multiple cement-based layers into a pavement design may provide a cost-effective method for achieving a stronger, more durable, sustainable pavement. For instance, using a cement-modified soil and cement-treated base as opposed to an unbound granular base placed on an unprepared subgrade can reduce the required thickness of the base material. In addition, a cement treated base may decrease the thickness needed for the concrete or asphalt surface, resulting in less materials and overall reduced cost. In addition to being the key constituent of new concrete pavement and concrete overlay surfaces, other unique surface applications of cement include roller compacted concrete (RCC), precast pavements, and pervious concrete pavements. Cement is also use in numerous pavement repair techniques, as well as an array of pavement recycling and reclamation applications.

Figure 1:
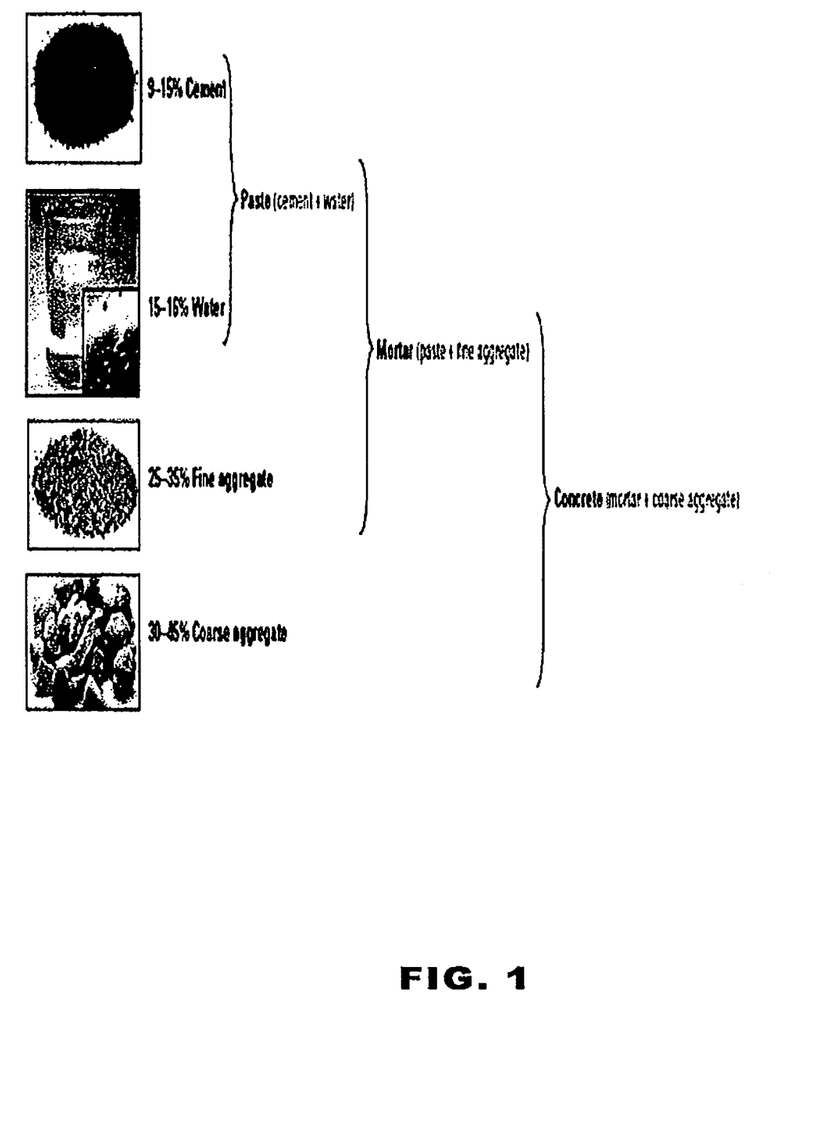
FIG. 1 describes the main ingredients and general overview of the concrete composition.

Mixtures for concrete pavements typically incorporate the following constituents: a blend of coarse and fine aggregates, Portland cement, water, and sometimes other cementations materials such as fly ash and slag cement, and/or chemical ad mixtures (see FIG. 1).

Although cement and concrete systems have adequate properties for many construction applications, there are many properties, like strength or deformation, which are not acceptable.

Polymer latex modified Portland cement systems develop significant changes in physical properties when compared against unmodified concrete and cement mortar. There are many patents about the use of latex-modified cement systems, specifically from styrene-butadiene polymer latex (SBR random), acrylic latex, EPDM and Ethylene vinyl acetate (EVA) latex to Portland cement having improved strength, flexibility, adhesion, elongation at break and others. However, there are not any patents describing the use of SBS latex. This type of latex is not reported in literature for concrete modification.

BRIEF DESCRIPTION OF THE INVENTION

The present invention is directed to cement and concrete compositions having significantly improved strength properties, modulus and elongation, which use a cement additive based on styrene-butadiene-styrene thermoplastic copolymer (SBS) in cationic latex, when compared against unmodified cement and concrete references. Most patent works that describe any other latex different from SBS latex, are addressed to flexibility improvements, but none of them are addressed to the improvement of strength and deformation.

In addition, these type of SBS lattices improved the elastic modulus of concrete, while most of the other lattices are used for improving the strength in cement. Elastic modulus improvement is an important variable for structural supports such as pillars and columns in bridges.

There are some applications like well cementing where plasticity is an important variable for concrete, where the concrete once cured can adopt the form of holes, or as stabilization of piping during well perforation. Here, the improvement of strength and deformation are critical variables because they have relation with plasticity. The polymer latex proposed in this invention helps to increase the plasticity in well cementing.

DETAILED DESCRIPTION OF THE INVENTION

The present invention focuses in the use of styrene-butadiene-styrene thermoplastic copolymer (SBS) latex as an additive in Portland cement or concrete to improve tensile strength, elastic modulus and plastic in cement mortar and final concrete formulations The term "Portland cement", as used herein, refers to the type of product obtained by heating lime-clay mixtures, or natural cement rock, to such temperature that practically the entire product is sintered followed to grinding. The product composition can include a mixture of di-calcium and tri-calcium silicate with some amounts of aluminate. Different additives can be included to obtain different properties and fast curing in accordance with Portland cement manufactures practice guides. For purposes of this invention and for evaluating what we call hydraulic cements, the cement used is known as calcium-aluminate cement.

In many examples, it may be desirable to combine the cement compositions of this invention with aggregate material to form the hydraulic concrete or concrete. In this regard, the preferred aggregate material is sand: however, any particulate material may be used including stone, gravel, granite, marble chips, mica and the like.

Figure 2:
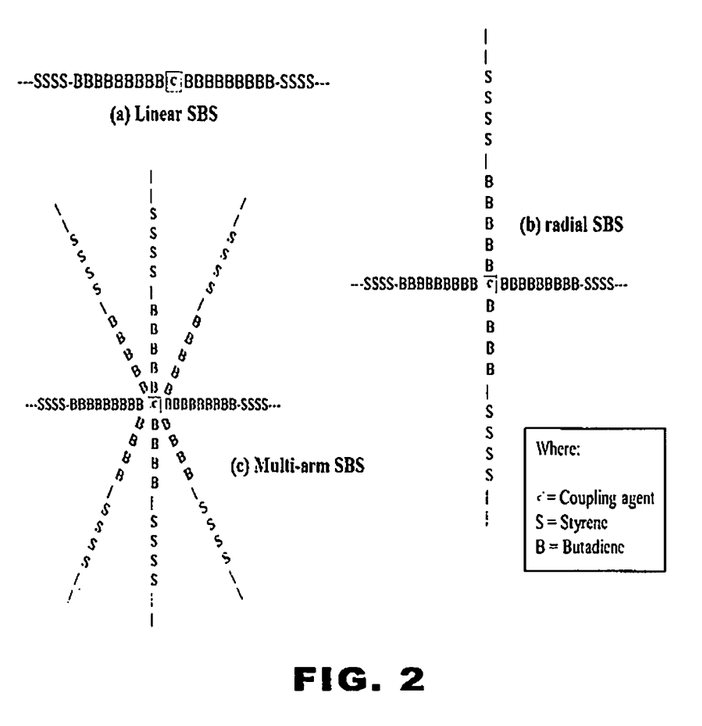
FIG. 2 describes describes different structural forms of SBS polymers, which can be used to formulate SBS latex. In this work, only linear SBS is included, but the rest can be used as references for future developments and patent works.
Figure 3:
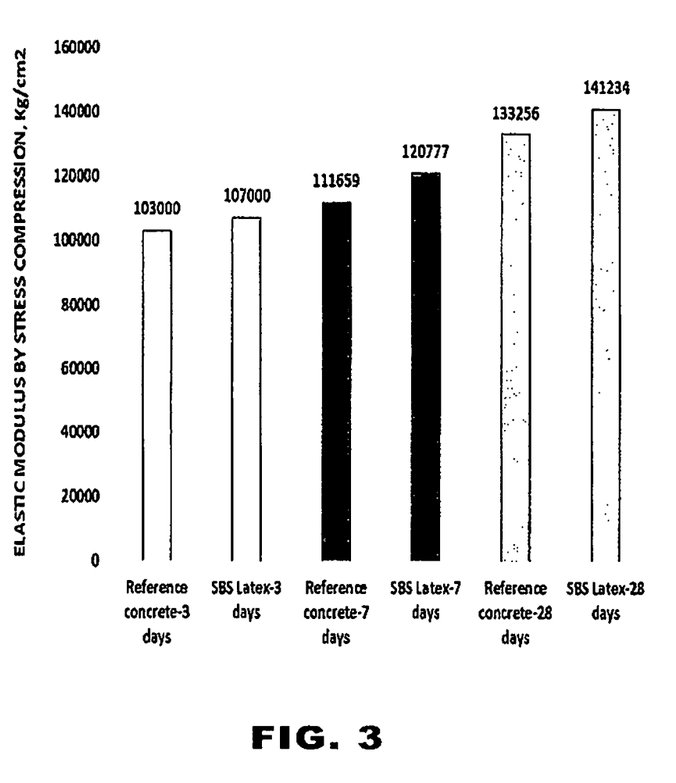
FIG. 3 shows a similar (even better) performance of elastic modulus by stress compression of modified concrete specimens (sample 2 from table 3) versus non-modified concrete.
Figure 4:
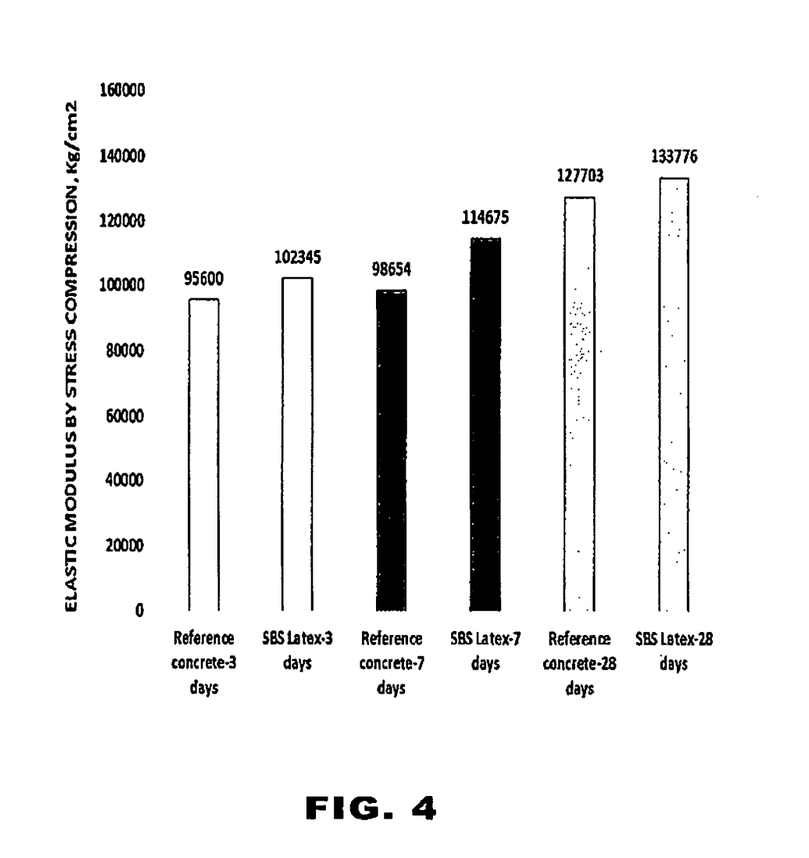
FIG. 4 as well as FIG. 3 shows a better performance of elastic modulus by stress compression of modified concrete specimens (sample 3 from table 3) versus non-modified concrete (conventional concrete). In addition, these results confirm the good improvement of SBS Latex in modified concrete formulation.
Figure 5:
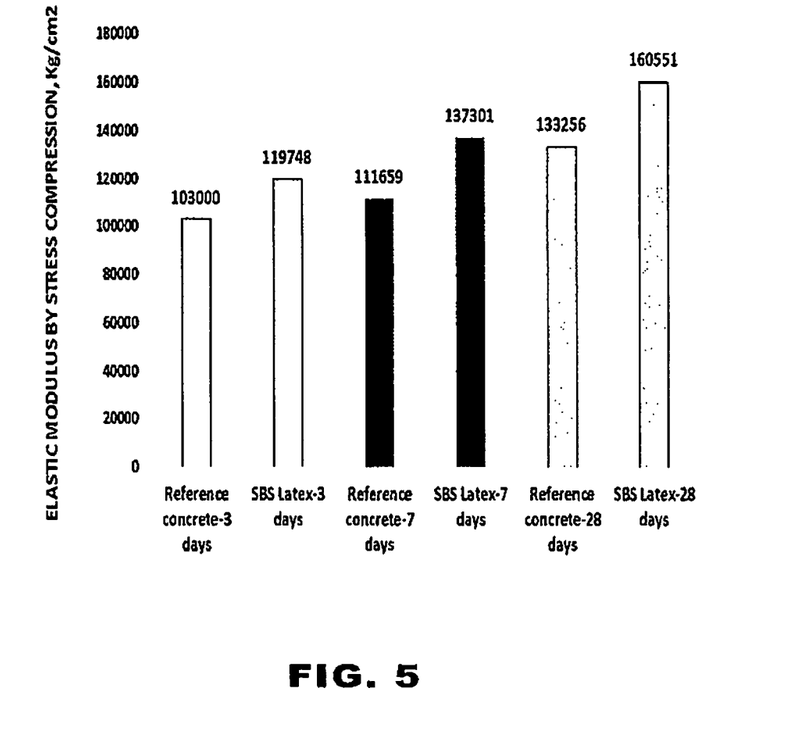
FIG. 5 also shows a better performance of elastic modulus by stress compression of modified concrete specimens (sample 4 from table 3) versus non-modified concrete (conventional concrete) Again, these results confirm the good improvement of SBS Latex in modified concrete formulation.
Figure 6:
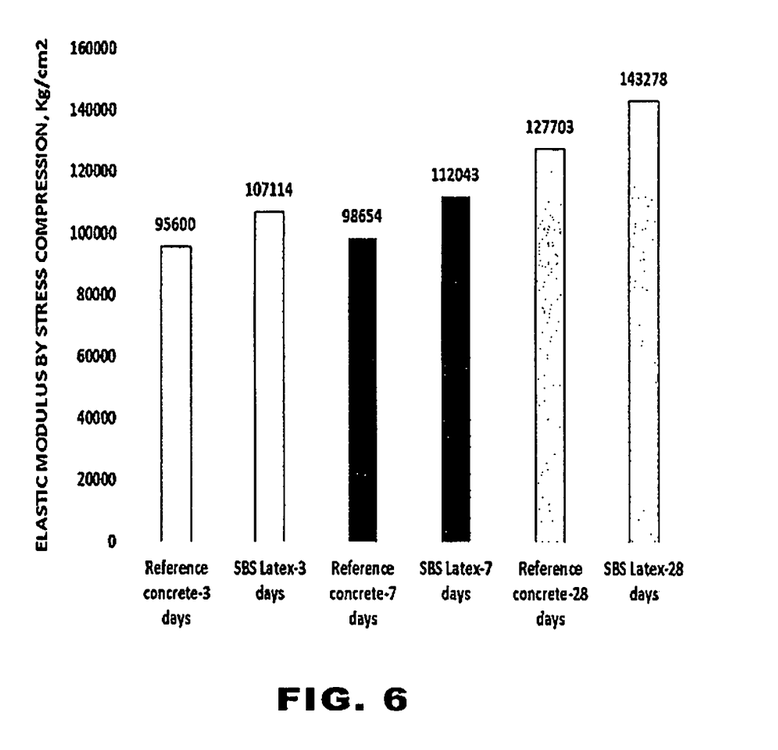
FIG. 6 also shows a better performance of elastic modulus by stress compression of modified concrete specimens (sample 5 from table 3) versus non-modified concrete (conventional concrete). In addition, these results confirm the good improvement of SBS Latex in modified concrete formulation.

The term "styrene-butadiene-styrene" latex, as used herein, means any aqueous colloidal dispersion from SBS. This SBS can have different configurations such as linear, radial or multiarm as shown in FIG. 2.

In this SBS latex the styrene content is moving from 10 to 50% weight/weight and the butadiene content is moving from 50 to 90% weight/weight, in polymer based. The total solids content in polymer latex is moving from 20 to 70% weight/weight. This polymer is emulsified in water containing emulsifying agent or agents in a stable system without any sediment with time. The size of micelles is moving from 2 to 60 microns.

For application examples in this patent, a linear SBS latex is used. In the first example, the SBS-latex is used as a cement modifier without any filler of aggregate into the formulation, wherein compressive strength increases in modified cement versus unmodified cement in specimens prepared under method ASTM C109. This method describes the methodology for testing the compression strength of mortars using cubes of material that are two inches on a side.

A mechanical testing machine equipped with the appropriate compression platens is used for the test. One of the platens must be spherically seated to allow slight tilt adjustment if the faces of the specimen are not perfectly parallel. The test machine operates in compression at slow test speeds in a load rate range indicated by the specification. Once the appropriate load rate is achieved, a constant rate of movement is maintained through sample break. Accurate speed control is required in order to maintain the rate of motion once the sample begins to yield and ultimately break. Hydraulic compression testers are preferred for these tests due to their high force capacity.

In a second example of the application, the linear SBS latex was used as a concrete modifier, where an aggregate with controlled granulometry was incorporated into the concrete formulation. Here there is an important increase in elastic modulus in specimens molded with modified concrete versus unmodified concrete.

Finally in a third example, the linear SBS latex was used as a concrete modifier and said examples shows that plasticity is increased in the modified concrete versus unmodified concrete. In this example, besides the combination of cement and SBS latex, a coarse aggregate and also a fine aggregate portion are included. The area of curve strength-deformation is larger in the case of modified concrete versus unmodified concrete and cure time is critical to obtain the maximum values.

Example 1

Evaluation of SBS Latex in Cement Mortar

Cement mortar was prepared for strength testing by mixing the ingredients mentioned in table 1, using a Hobart mixer.

TABLE 1

Ingredients and recipe or preparing a cement mortar

| INGREDIENT | REFERENCE (grams) | COMPOSITION 1 (grams) | COMPOSITION 2 (grams) | COMPOSITION 3 (grams) |
|---|---|---|---|---|
| Standard Silica Sand | 1,950 | 1,950 | 1,950 | 1,950 |
| Portland Cement | 450 | 450 | 450 | 450 |
| SBS Latex | 0 | 114 | 231 | 285 |
| Water | 459 | 345 | 228 | 174 |

The mortar was molded into 2 inch cubes and tensile briquettes with a 1 inch square cross section in accordance with ASTM methods. The specimens were wet-cured for 24 hours and cured in air at 72° F. and 50% of relative humidity for 30 days. Half of specimens were tested on compressive and tensile strength. The other half was immersed in water for seven days and then tested wet. In this experiment linear SBS latex with 55% weight/weight solids was used in the ratio described in table 1. The results of compressive strength are described in table 2.

The increase in compressive strength and tensile strength are important variables for applications as adhesive cement paste for glazed tile and ceramics, as well as cement coatings for walls and ceiling (Tyrol).

TABLE 2

Results of compressive strength for cement mortar

Cement Results

| Compressive Strength, PSI (according with ASTM C109) | Reference of Mortar cement without SBS Latex | Modified Mortar cement with SBS latex (composition 1) | Modified Mortar cement with SBS latex (composition 2) | Modified Mortar cement with SBX latex (composition 3) |
|---|---|---|---|---|
| First Condition: 14 days and air dried | 5467 | 7277 | 8344 | 9941 |
| Second Condition: 14 days air dried + 14 days inmersed in water | 4768 | 5301 | 5578 | 7011 |
| Tensile Strength; PSI (ASTM C109) | | | | |
| 14 days air dried + 14 days inmersed in water | 462 | 599 | 698 | 792 |

Example 2

Evaluation of Elastic Modulus Using SBS Latex in Modified Concrete

Concrete modification studies were done using formulations described in table 3.

TABLE 3

Concrete Formulations

| INGREDIENT | Sample 1: Reference for unmodified concrete | Sample 2: Modified Concrete using SBS latex[a] | Sample 3: Modified Concrete using SBS latex[b] | Sample 4: Modified Concrete using SBS latex[a] | Sample 6: Modified Concrete using SBS latex |
|---|---|---|---|---|---|
| Cement; % weight/weight | 15 | 14.25 | 13.5 | 14.3 | 13.5 |
| Water, % weight/weight | 5 | 4.25 | 3.5 | 4.2 | 3.5 |
| Latex, % weight/weight | 0 | 1.5 | 3 | 1.5 | 3.0 |
| Fine Aggregate, % weight/weight | 35 | 35 | 35 | 20 | 20 |
| Coarse Aggregate, % weight/weight | 45 | 45 | 45 | 60 | 60 |

NOTE:
[a] For having at the end around 0.75% SBS in finished modified concrete.
[b] For having at the end around 1.5% SBS in finished modified concrete.

On the other hand, table 4 describes the particle size curve per each aggregate used in this investigation.

TABLE 4

Particle size curves for aggregates used in this work

| Particle Size Sieve | Fine Aggregate, % pass | Coarse Aggregate, % pass |
|---|---|---|
| 7.62 centimeters | | 0 |
| 5.08 centimeters | | 0 |
| 3.81 centimeters | | 100 |
| 1 centimeter | | 99.6 |
| 1.90 centimeters | | 63.6 |
| 1.27 centimeters | | 15.1 |
| 0.95 centimeter | 100 | 6.7 |
| No. 4 | 90.9 | 2.5 |
| No. 8 | 70.6 | 1.9 |
| No. 16 | 53.8 | |
| No. 30 | 44.3 | |
| No. 50 | 38.4 | |
| No. 100 | 30.9 | |
| No. 200 | 23.3 | |

Combination of both aggregates according with the recipes described in table 3, allowed to mold cylindrical specimens for measuring elastic modulus according with ASTM C39. SBS latex was used as an additive in the concrete formulation using 0.75% and 1.5% weight/weight of SBS polymer in the final composition. FIGS. 3, 4, 5 and 6 show the performance of modified concrete versus unmodified concrete at three levels of concrete set curing.

The ASTM C39 method covers determination of compressive strength of cylindrical concrete specimens such as molded cylinders and drilled cores. It is limited to concrete having a density in excess of 800 kg/m3 [50 lb/ft3].

Cylinders cast and cured in the field are transported to the laboratory within 24 to 48 hours of production. Cylinders are then cured in water (or high-humidity chamber) for the specified curing period (e.g., 7 days, 28 days, etc.). On the date the cylinder has cured for the specified period of time, the cylinder is removed from the water tank and tested in compression with strength and failure mode reported.

An increase in elastic modulus is important for hydraulic concrete used as structural support of columns and pillar for bridges.

Example 3

Evaluation of Plasticity Using SBS Latex in Modified Concrete

Using formulations described in table 5 and aggregates from table 4, the stress-strain figure was determined according with ASTM C39, leaving deformation more than 40% until break in test specimen.

TABLE 5

Formulations of modified and unmodified concrete for plasticity studies.

| INGREDIENT | Sample 1: Reference for unmodified concrete | Sample 2: Modified Concrete using SBS latex | Sample 3: Modified Concrete using SBS latex |
|---|---|---|---|
| Cement; % weight/weight | 15 | 13.5 | 12 |
| Water, % weight/weight | 5 | 3.5 | 2 |
| Latex, % weight/weight | 0 | 3 | 6 |
| Fine Aggregate, % weight/weight | 35 | 35 | 35 |
| Coarse Aggregate, % weight/weight | 45 | 45 | 45 |

NOTE:
a. For having at the end around 1.5% SBS in finished modified concrete.
b. For having at the end around 3.0% SBS in finished modified concrete.

Figure 7:
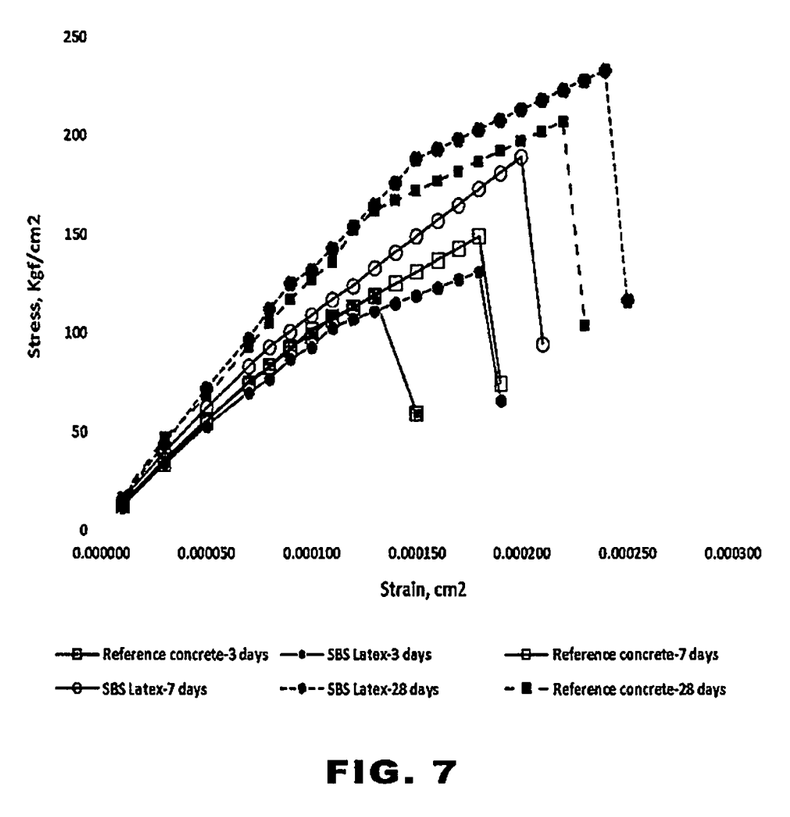
FIG. 7 indicates that area percentage below the curve Stress/Strain is higher in modified concrete using SBS latex at 1.5% of SBS polymer than unmodified concrete. This performance defines a better plasticity in modified concrete specimens.
Figure 8:
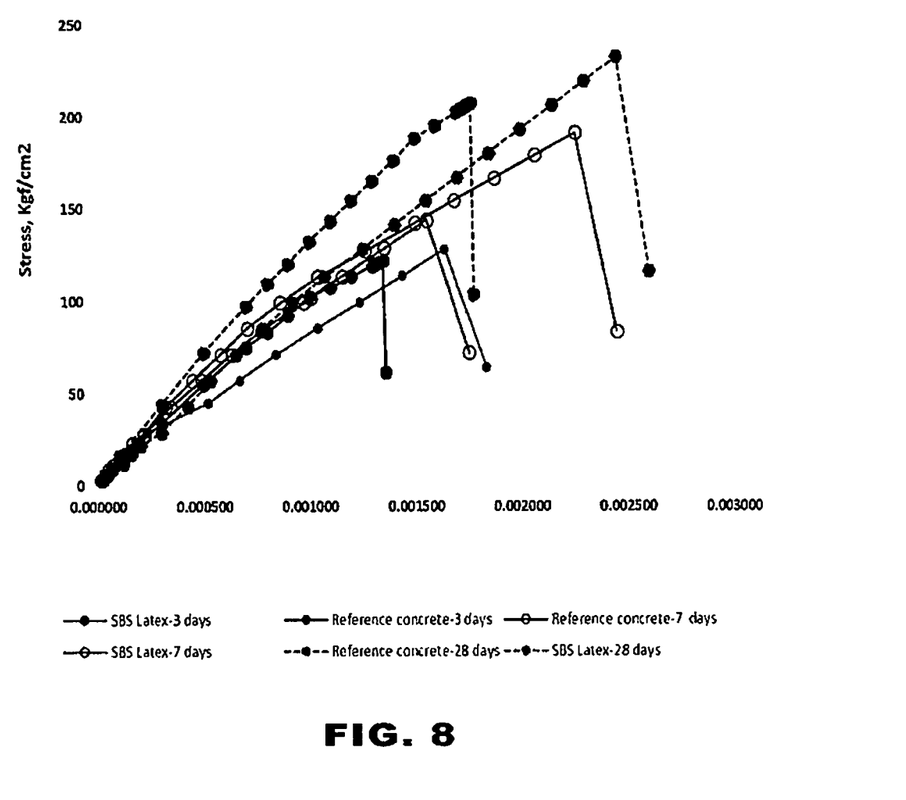
FIG. 8 as well as FIG. 7, indicates that area percentage below the curve Stress/Strain is higher in modified concrete using SBS latex at 3% of SBS polymer than unmodified concrete. This performance defines a better plasticity in modified concrete specimens.

FIGS. 7 and 8 show the stress-strain figures with two different SBS latex concentration in modified concrete.

An increase of area below the curve of stress-strain defines the plasticity. The higher the area, the higher the plasticity. SBS latex improves plasticity in concrete which can be interesting for well cementing applications where hydraulic concrete needs to be molded into the cavity where oil piping is introduced to get the oil well for pumping. The application can be considered for use in Portland cements standard quality and class H and G (for well cementing).

What is claimed is:

1. A method of forming Portland cement and/or concrete compositions, comprising:
    combining 13.5 to 15% weight/weight of cement, 20 to 35% weight/weight of fine aggregate, 45 to 60% weight/weight of coarse aggregate, and 3.5 to 4.3% weight/weight of water with SBS latex as an additive between 1.5 to 3% weight/weight, wherein the SBS latex contains 20 to 70% of SBS polymer in aqueous latex, and wherein an increase in elastic modulus of 4.5 to 17% in said cement and/or concrete composition is observed.

2. The method of claim 1, wherein the SBS latex is combined with cement in proportions of 1 to 10%.

3. The method of claim 1, wherein the SBS polymer consists of styrene compositions from 10 to 45% weight/weight and by butadiene compositions from 55 to 90% weight/weight.

4. The method of claim 1, wherein the SBS polymer has linear, radial or multi-arm configuration.

5. The method of claim 1, wherein the presence of SBS latex allows an improvement of 25 to 45% in compression strength in dry specimens and an improvement of 10 to 30% in compression strength in wet specimens.

6. The method of claim 1, wherein the presence of SBS latex allows an improvement of 23 to 42% in tensile strength in dry specimens.

7. A concrete composition comprising 13.5 to 15% weight/weight of cement, 20 to 35% weight/weight of fine aggregate, 45 to 60% weight/weight of coarse aggregate, and 3.5 to 4.3% weight/weight of water, characterized in that said composition further comprises 1.5 to 3% weight/weight of SBS latex and wherein an increase in elastic modulus in said composition of 4.5 to 17%, is observed.

8. A concrete composition comprising 12 to 15% weight/weight of cement, 35% weight/weight of fine aggregate, 45% weight/weight of coarse aggregate, and 2 to 3.5% weight/weight of water, characterized in that said composition further comprises 3 to 6% weight/weight of SBS latex, wherein an increase in tensile strength of 4 to 21% and an increase in strain of 8 to 30% in said composition, is observed.

* * * * *